(12) United States Patent
Barault et al.

(10) Patent No.: US 10,587,759 B2
(45) Date of Patent: Mar. 10, 2020

(54) METHOD AND DEVICE FOR OPTIMIZING THE METERING AND USE OF DATA BY A MOBILE TERMINAL

(71) Applicant: ORANGE, Paris (FR)

(72) Inventors: Eric Barault, Thorigne Fouillard (FR); Simon Bertrand, Paris (FR)

(73) Assignee: ORANGE, Paris (FR)

( * ) Notice: Subject to any disclaimer, the term of this patent is extended or adjusted under 35 U.S.C. 154(b) by 12 days.

(21) Appl. No.: 15/329,567

(22) PCT Filed: Jul. 27, 2015

(86) PCT No.: PCT/FR2015/052076
§ 371 (c)(1),
(2) Date: Jan. 26, 2017

(87) PCT Pub. No.: WO2016/016568
PCT Pub. Date: Feb. 4, 2016

(65) Prior Publication Data
US 2017/0214803 A1 Jul. 27, 2017

(30) Foreign Application Priority Data
Jul. 29, 2014 (FR) ...................... 14 57351

(51) Int. Cl.
*H04M 15/00* (2006.01)
*H04L 12/14* (2006.01)
(Continued)

(52) U.S. Cl.
CPC .......... *H04M 15/46* (2013.01); *H04L 12/141* (2013.01); *H04L 12/1407* (2013.01);
(Continued)

(58) Field of Classification Search
CPC ...... H04M 15/46; H04M 15/61; H04M 15/78; H04M 15/7652; H04L 12/141; H04W 84/042
See application file for complete search history.

(56) References Cited

U.S. PATENT DOCUMENTS 8,644,255 B1 * 2/2014 Burcham .............. H04W 88/06
370/331
2009/0094142 A1 4/2009 Falk et al.
(Continued)

FOREIGN PATENT DOCUMENTS

SE WO 2011/020498 * 5/2009 ............. H04L 12/14
WO WO 2011/020498 A1 8/2009

OTHER PUBLICATIONS

3rd Generation Partnership Project; Technical Specification Group Services and System Aspects; Telecommunication management; Charging management; Diameter charging applications (Release 12), 3GPP Standard; 3GPP TS 32.299, 3rd Generation Partnership Project (3GPP), vol. SA WG5, No. V12.5.0, Jun. 27, 2014, pp. 1-165.
(Continued)

*Primary Examiner* — Muthuswamy G Manoharan
(74) *Attorney, Agent, or Firm* — Knobbe, Martens, Olson & Bear, LLP

(57) ABSTRACT

One embodiment relates to a method for sharing consumption of an electronic communication service by a mobile terminal, a session for consuming the service being established initially between the terminal and a gateway between the mobile network and a packet-switched network, remaining credit for consuming the service being attributed initially to the terminal. The terminal periodically requests authorisation to consume a predetermined quota of the remaining credit. A request to track the credit of the terminal is received and a message, intended for launching a credit request for (Continued)

Figure 1:
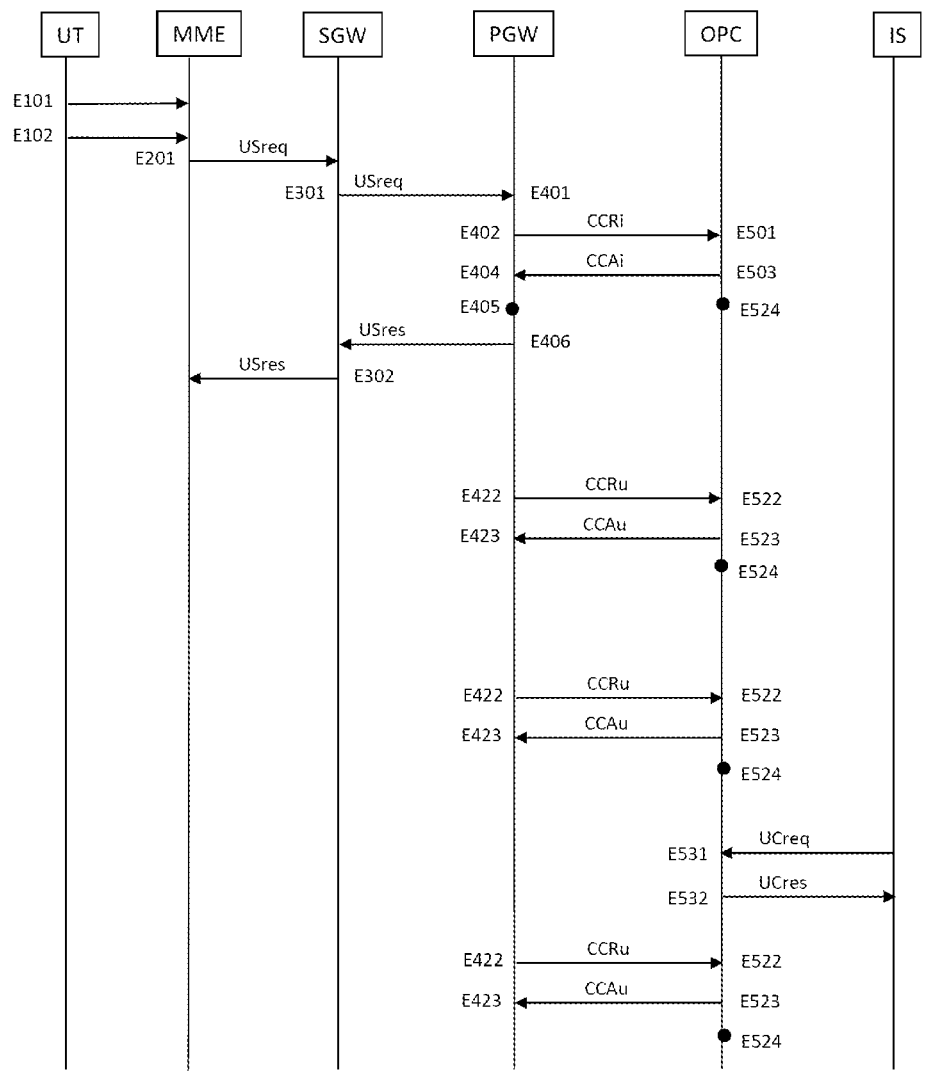

the terminal is transmitted to the gateway. A credit request message for the terminal including information relating to a portion of the predetermined quota consumed by the terminal is received from the gateway. The remaining credit is updated accordingly. A response to track the credit of the terminal for the service, including the updated value of the remaining credit is transmitted.

8 Claims, 4 Drawing Sheets

(51) Int. Cl.
    *H04W 84/04*     (2009.01)
    *H04W 4/24*     (2018.01)
    *H04W 88/06*     (2009.01)

(52) U.S. Cl.
    CPC ........ *H04L 12/1467* (2013.01); *H04M 15/61* (2013.01); *H04M 15/66* (2013.01); *H04M 15/765* (2013.01); *H04M 15/7652* (2013.01); *H04M 15/78* (2013.01); *H04M 15/83* (2013.01); *H04M 15/85* (2013.01); *H04M 15/854* (2013.01); *H04M 15/856* (2013.01); *H04W 4/24* (2013.01); *H04W 84/042* (2013.01); *H04W 88/06* (2013.01)

(56) References Cited

U.S. PATENT DOCUMENTS

| | | | |
|---|---|---|---|
| 2012/0324126 A1* | 12/2012 | Steindl | H04L 29/12028 709/245 |
| 2014/0105018 A1 | 4/2014 | Andrews et al. | |
| 2014/0378094 A1* | 12/2014 | Gillick | H04M 15/7652 455/406 |
| 2015/0163617 A1* | 6/2015 | Hall | H04W 4/20 455/414.1 |
| 2017/0048739 A1* | 2/2017 | Jeong | H04W 4/70 |
| 2017/0195245 A1* | 7/2017 | Bhatia | H04L 47/626 |

OTHER PUBLICATIONS

International Preliminary Report on Patentability dated Jan. 31, 2017 for Application No. PCT/FR2015/052076, filed Jul. 27, 2015, in 9 pages.
Written Opinion/Search Report from Application PCT/FR2015/052076 dated Nov. 15, 2015.

* cited by examiner

METHOD AND DEVICE FOR OPTIMIZING THE METERING AND USE OF DATA BY A MOBILE TERMINAL

RELATED APPLICATIONS

This application is the U.S. National Phase of Application No. PCT/FR2015/052076 entitled "METHOD AND DEVICE FOR OPTIMISING THE METERING AND USE OF DATA BY A MOBILE TERMINAL" filed Jul. 27, 2015, which designated the United States, and which claims the benefit of French Application No. 1457351 filed Jul. 29, 2014.

1. FIELD OF THE INVENTION

The patent application is in the field of mobile core network architecture referred to as EPC (Evolved Packet Core) and defined by 3GPP from Release 8, and more particularly in the field of charging for data usage during transmission and reception by a mobile terminal.

2. STATE OF THE ART

When data is being consumed during transmission and/or reception, which is performed by a mobile terminal, usage meters are updated periodically by quota exchange mechanisms between a control entity located in management equipment and a charging entity located in transport equipment.

Hereafter, the term "control entity" denotes equipment referred to as PCRF (Policy and Charging Rules Function) and/or equally equipment referred to as OCS (Online Charging System). The term "charging entity" denotes the function referred to as PCEF (Policy and Charging Enforcement Function) of a PDN-GW gateway (Packet Data Network Gateway, also known as a P-GW gateway).

The size of the quotas allocated by the control entity, i.e. the transmission and/or reception data usage fraction authorized for a customer, without there being a new exchange between the control and charging entities, therefore defines the periodicity with which the usage meters are updated, and the precision of these meters.

To increase the precision of the meters, one solution would be to reduce the size of the quotas, but this would excessively increase the frequency and number of exchanges between the control and charging entities, and adversely affect the correct operation of these entities.

One of the aims of the invention is to remedy these drawbacks of the prior art.

When a customer exhausts the last quota allocated by the control entity, the session for consuming the service in progress is terminated. If said customer is associated with another customer, for example by a common contract with the service provider, and if there still is credit not allocated to this other customer, it is conceivable for the control entity to transfer a part of it to the customer, except if the other customer is consuming his/her credit, since in that case the control entity cannot accurately determine the state of the usage meters of the other associated customer.

It is therefore not possible to establish a precise tracking of the usage meters of a group of customers linked by a common contract, such as members of the same household, or employees of the same company, in order to dynamically modify the sharing of a remaining overall consumption credit for the group.

One of the aims of the invention is to remedy these drawbacks of the prior art.

3. DESCRIPTION OF THE INVENTION

The invention arrives at improving the situation using a method for tracking the consumption of an electronic communication service by a mobile terminal attached to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the method comprising the following steps:

reception of a credit tracking request relating to the terminal for said service, transmission of a message to the gateway, intended to trigger a credit request relating to the terminal, reception of a credit request message from the gateway, relating to the terminal, the message containing information relating to a part of the predetermined quota consumed by the terminal, update of the remaining credit according to the information, transmission of a credit tracking answer relating to the terminal for said service, containing the value of the remaining credit updated according to the information.

Periodically, the gateway obtains for the terminal a quota of credit to consume the service, by virtue of a credit request which the gateway transmits to an entity controlling the credit. According to the prior art, the only moment at which an exact tracking of the consumption performed by the terminal is possible is the precise instant of the reception of this credit request, before the consumption of a new quota begins. Specifically, the request message is a carrier of information relating to the consumed portion of the last credit quota granted to the terminal. By virtue of the invention, regardless of the instant when a request to track the credit of the terminal is made, a new credit request is triggered. This credit request indicates which portion of this quota has already been consumed by the terminal since the last authorization to consume the quota. It is understood that, according to the invention, only one exchange of messages with the gateway is needed to obtain, at the desired moment, a tracking of the consumption of the terminal which is exact, regardless of the size of the credit quota assigned periodically to the terminal.

According to the prior art, such a credit request can be triggered only by the gateway, only when the terminal needs credit. The triggering of this credit request, by equipment other than the gateway, and at a moment when the terminal does not necessarily need credit, runs counter to the preconceptions of a person skilled in the art.

The invention also relates to a method for sharing the consumption of an electronic communication service by a mobile terminal attached to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the method comprising the following steps:

transmission of a message to the gateway, intended to trigger a credit request relating to the terminal, reception of a credit request message from the gateway, relating to the terminal, the message containing information relating to a part of the predetermined quota consumed by the terminal, update of the remaining credit according to the information, where the updated remaining credit is less than the predetermined quota, and where the terminal is associated with at least one other terminal, another session for consuming the service having been established with the other terminal, the method additionally comprising the following steps:

transmission of a message intended to trigger a credit request relating to the at least one other terminal, reception of a credit request message relating to the at least one other terminal, the message containing information relating to a part of another predetermined quota consumed by the at least one other terminal, update of the remaining credit for the at least one other terminal according to the information, and, if the remaining credit for the at least one other terminal is greater than or equal to a predetermined threshold:

sharing of the remaining credit for the at least one other terminal, between the terminal and the at least one other terminal, transmission of a credit answer message to the gateway, relating to the terminal, containing an authorization for the terminal to consume the predetermined credit quota.

In the case of a service offer under a single contract for a group of several members of the same household, or several employees of the same company, a user might exhaust his/her remaining credit during a session before the other users in the group. If no quota can be assigned to the user, the session is terminated due to a lack of credit, and the service is cut off.

According to the invention, when the remaining credit is exhausted, the method tracks the precise consumption regarding the other sessions in the group, and determines if there is credit elsewhere to be redistributed in order to allow the session to continue, allocates if necessary a new quota of credit to the session, and thus prevents the service from being cut off.

According to one aspect of the invention, the message to the gateway, intended to trigger a credit request relating to the terminal, is a Diameter RAR message.

According to one aspect of the invention, the credit request message from the gateway, relating to the terminal, is a Diameter CCR message.

According to one aspect of the invention, the credit answer message to the gateway, relating to the terminal, is a Diameter CCA message.

According to one aspect of the invention, the transmission of a CCA message in response to the reception of a corresponding CCR message is deferred at least until another CCR message is received.

By virtue of this aspect, when a control entity receives a credit request for a session in progress and when the credit is exhausted, a negative response will not be transmitted immediately thereafter. It will be transmitted after another request is received which may indicate that there is shareable credit elsewhere. Thus, a needless cutoff of the service is avoided.

The invention also relates to a device for tracking the consumption of an electronic communication service by a mobile terminal attached to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the device comprising the following modules:

reception of a credit tracking request relating to the terminal for said service, transmission of a message to the gateway, intended to trigger a credit request relating to the terminal, reception of a credit request message from the gateway, relating to the terminal, the message containing information relating to a part of the predetermined quota consumed by the terminal, update of the remaining credit according to the information, transmission of a credit tracking answer relating to the terminal for said service, containing the value of the remaining credit updated according to the information.

This device, suitable for implementing in all its embodiments the method for tracking the consumption of an electronic communication service by a mobile terminal attached to a mobile network, which has just been described, is intended to be implemented in a control entity, specialized in establishing PCC control rules (QoS and billing characteristics) for IP connectivity sessions (user sessions), for example in PCRF (Policy Control and Charging Rules Function) equipment, or in OCS (Online Charging System) equipment.

The invention also relates to a device for sharing the consumption of an electronic communication service by a mobile terminal attached to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the device comprising the following modules:

transmission of a message to the gateway, intended to trigger a credit request relating to the terminal, reception of a credit request message from the gateway, relating to the terminal, the message containing information relating to a part of the predetermined quota consumed by the terminal, update of the remaining credit according to the information, where the updated remaining credit is less than the predetermined quota, and where the terminal is associated with at least one other terminal, another session for consuming the service having been established with the other terminal, the device additionally comprising the following modules:

verification as to whether a remaining credit for another terminal is greater than or equal to a predetermined threshold, sharing of a remaining credit for at least one other terminal with the terminal, transmission of a credit answer message relating to the terminal, the message containing an authorization for the terminal to consume a predetermined credit quota.

This device, suitable for implementing in all its embodiments the method for sharing the consumption of an electronic communication service by a mobile terminal attached to a mobile network, which has just been described, is intended to be implemented in a control entity, specialized in establishing PCC control rules (QoS and billing characteristics) for IP connectivity sessions (user sessions), for example in PCRF (Policy Control and Charging Rules Function) equipment, or in OCS (Online Charging System) equipment.

The invention also relates to a mobile network control entity comprising a device to track the consumption of an electronic communication service by a mobile terminal attached to a mobile network, and/or a device to share the consumption of an electronic communication service by a mobile terminal attached to a mobile network.

The invention also relates to a computer program containing instructions for implementing the steps of the method for tracking the consumption of an electronic communication service by a mobile terminal attached to a mobile network, and/or of the method for sharing the consumption of an electronic communication service by a mobile terminal attached to a mobile network, which has just been described, when this program is executed by a processor.

Lastly, the invention relates to a recording medium readable by a mobile network control entity, on which medium the program, which has just been described, is recorded, able to use any programming language and be in the form of source code, object code or a code intermediate between source code and object code, such as in a partially compiled form or in any other desirable form.

4. DESCRIPTION OF THE DRAWINGS

Figure 2:
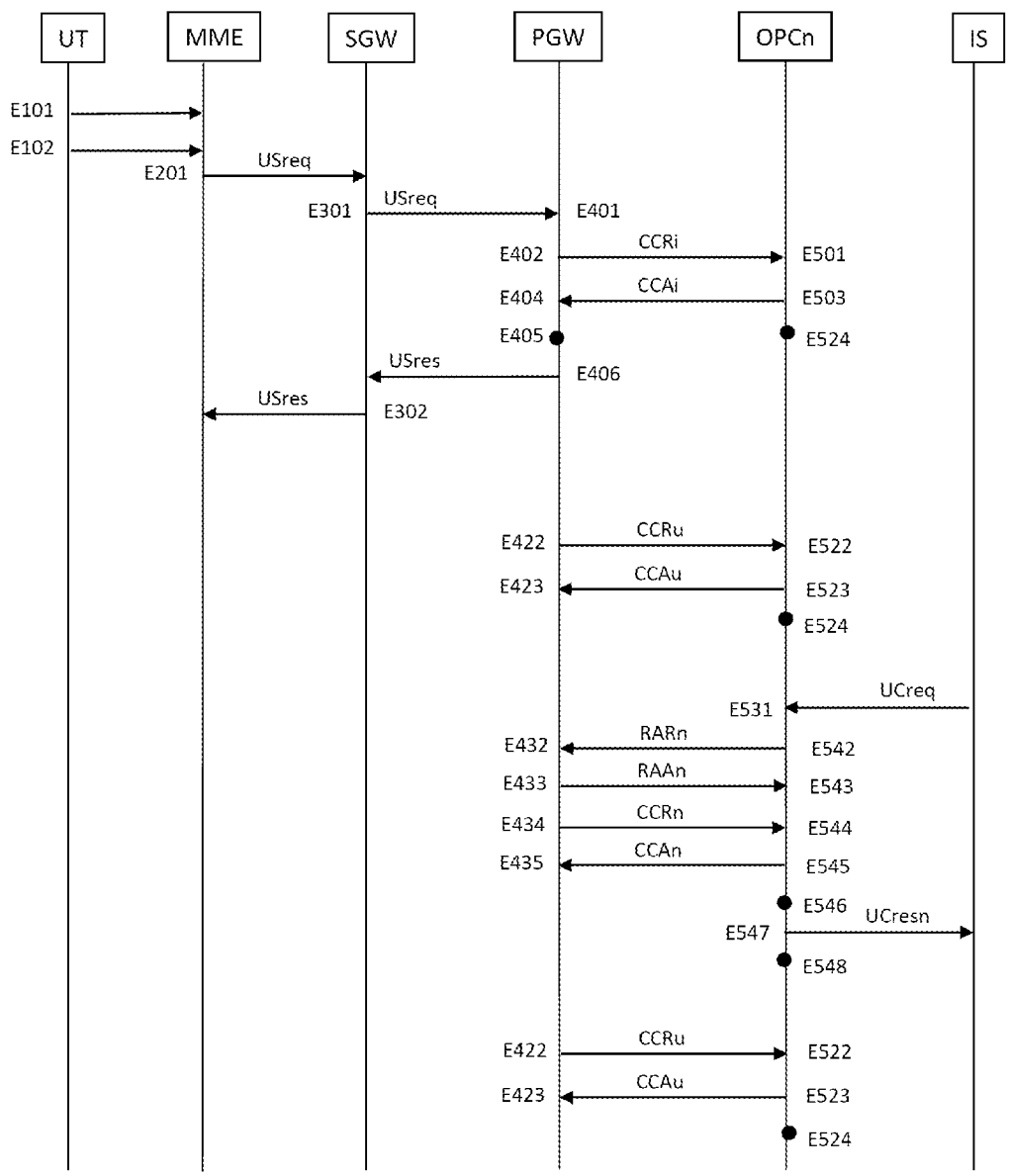
Figure 3:
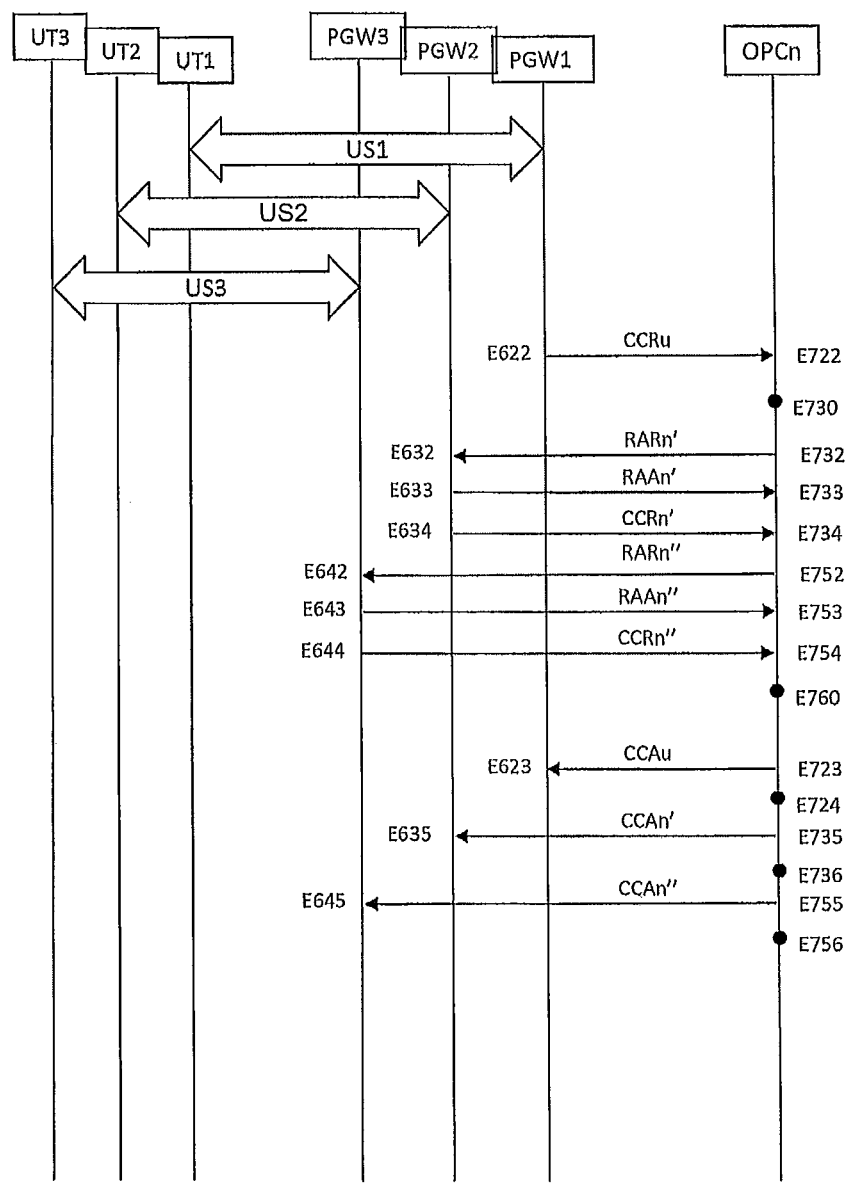
Figure 4:
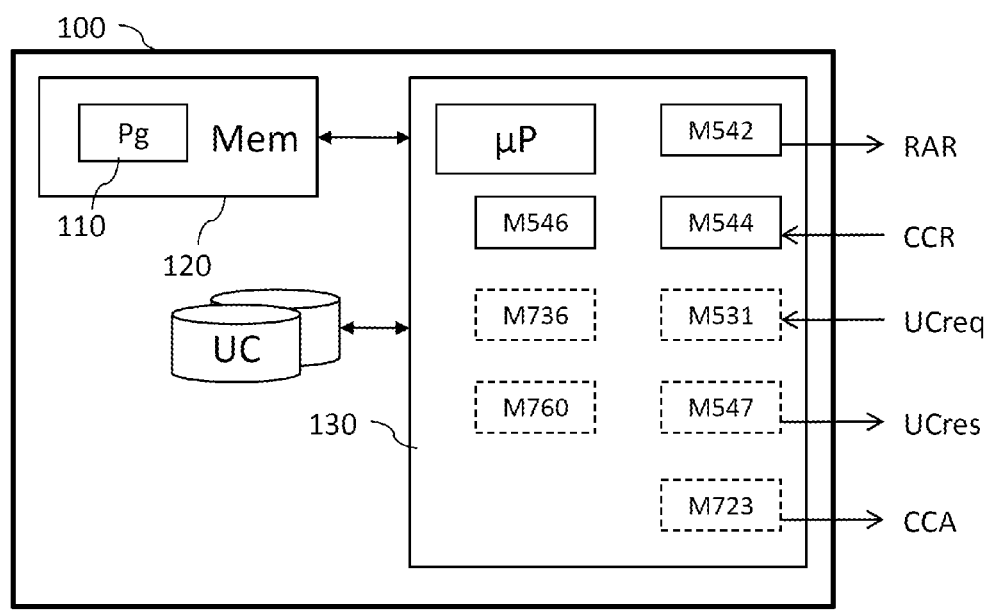

Other advantages and features of the invention will become clearer upon reading the following description of a particular embodiment of the invention, which embodiment is given by way of simple illustrative and nonlimiting example, and from the appended drawings in which:

FIG. 1 presents an example sequence and implementation of the steps of a method for tracking the consumption of an electronic communication service by a mobile terminal attached to a mobile network, according to the prior art, FIG. 2 presents an example sequence and implementation of the steps of a method for tracking the consumption of an electronic communication service by a mobile terminal attached to a mobile network, according to an aspect of the invention, FIG. 3 presents an example sequence and implementation of the steps of a method for tracking and sharing the consumption of an electronic communication service by a mobile terminal attached to a mobile network, according to an aspect of the invention, when the terminal is capable of sharing usage credit with other terminals, FIG. 4 presents an example structure of a device to track the consumption of an electronic communication service by a mobile terminal attached to a mobile network, according to an aspect of the invention.

5. DETAILED DESCRIPTION OF AT LEAST ONE EMBODIMENT OF THE INVENTION

Hereafter in the description, examples of several embodiments of the invention are presented, based on an LTE/EPC (Long-Term Evolution/Evolved Packet Core, 3GPP standard, also known as 4G) network, but the invention applies also to previous generations (2G, 3G) and future generations (5G, etc) of the 3GPP standards.

FIG. 1 presents an example sequence and implementation of the steps of a method for tracking the consumption of an electronic communication service by a mobile terminal attached to a mobile network, according to the prior art.

In the EPC mobile core network architecture defined by 3GPP from Release 8, several entities of the network core participate in establishing a user session US between the terminal UT and the gateway PGW: the Mobility Management Entity (MME), the Serving Gateway (SGW) and the PDN gateway (PGW).

The management entity MME is an entity of the EPC control plane (signaling), the main aim of which is to manage mobility procedures (signaling between the nodes of the core network for mobility).

The Serving Gateway (SGW) provides, among other aspects, the anchoring of the media when the mobile terminal changes radio access point during a session, charging functions and buffering of the media intended for the end user when radio connectivity is not yet established.

The PDN gateway (PGW) provides, among other aspects, IP connectivity to the end users (IP address allocation), charging functions, and functions for enforcing advanced QoS (Quality of Service) policies by virtue of its PCEF function.

The PCRF (Policy and Charging Rules Function) control entity: this is the entity controlling the mobile network, according to various data sent by the network (access type, SGW address, etc) and according to the policy of the operator for each type of subscription, the user database (offer type, etc) or information on the service such as codec and media type. The PCRF control entity defines the QoS and billing characteristics for the user session.

The OCS (Online Charging System) credit/balance consumption entity controls the credit and balance available to the users. The PCEF function of the PGW gateway opens a credit control session with the OCS entity in order to allow control of the remaining credit balance to be consumed by the user.

During the procedure to open a user session US (also called an IP connectivity session, or an IP CAN session), the PCEF function of the PGW gateway opens a control session to the OCS control entity and if necessary to the PCRF control entity.

Since usage control functions are present in both the PCRF and in the OCS, hereafter, the term "control entity" denotes equally an OCS entity, a PCRF entity, or both. Likewise, the term "gateway" used alone denotes the PGW gateway.

During a step E101, the terminal UT transmits to the management entity MME a request to attach to the mobile network, or "Attach request", followed by, during a step E102, a PDN connectivity request.

During a step E201, the management entity MME transmits to the gateway SGW a request USreq to open the user session US, which the gateway SGW transmits to the gateway PGW during a step E301.

During a step E401, the gateway PGW receives the request to open a user session US. Before responding to this request, the gateway PGW must retrieve the control rules applicable to this session. To this end, it must open a control session with the control entity OPC.

During a step E402, the gateway PGW then transmits an initial request CCRi (Credit Control Request), for example of the Diameter type, to the control entity OPC. This request CCRi opens the control session and contains the following parameters:
  control session identifier;
  IMSI and/or MSISDN of the user;
  access type;
  APN;
  IP address of the gateway SGW;

MCC and MNC of the gateway SGW;
IP address of the gateway PGW;
IP address of the user;
MCC and MNC of the user.

After receiving the request CCRi during a step E501, the control entity OPC then determines the set of control rules applicable to the requested session US, according to received parameters, configurations of OPC entities and customer subscription information in the databases associated with the OPC entities. For example, if the MSISDN or IMSI parameters correspond to a prepaid user offer, then a credit control must be applied for the user.

During a step E503, the control entity OPC transmits an initial answer CCAi (Credit Control Answer), for example of the Diameter type.

This answer CCAi contains the following parameters:
control session identifier;
quality of service to be applied for each service;
quality of service to be applied for the user session;
services to block or to authorize;
whether credit control is applicable for the user; and,
if necessary, a usage quota allocated to the user session.

After receiving the answer CCAi during a step E404, the PGW then applies during a step E405 the set of received control rules to the requested user session US. The user session US is then opened by the gateway PGW during a step E406 at which a response USres to open the user session is transmitted from the gateway PGW to the gateway SGW, which the gateway SGW transmits to the management entity MME during a step E302. At this stage, the user session US becomes alive.

During a step E524, the control entity OPC updates a meter associated with the remaining total credit for the session US, by subtracting from the allocated quota.

When the gateway PGW detects that the usage quota is reached for the session US, the gateway PGW then transmits to the control entity OPC, during a step E422, an update request CCRu containing information relating to the consumed quota.

During a step E522, the control entity OPC receives the request CCRu, and deduces from it that a new usage quota must be allocated to the session US.

During a step E523, the control entity OPC transmits to the gateway PGW an update answer CCAu containing a new usage quota allocated to the user session, after having verified that the remaining total credit for the user for this session allows it.

The control entity OPC updates the meter associated with the remaining total credit, by subtracting from the allocated quota, during a new occurrence of step E524.

During a step E423, the gateway PGW receives the update answer CCAu, and applies to the user session US, without interrupting it, the control rules updated by the message CCAu, in this case the new usage quota that the user is authorized to consume for the session US.

Several iterations of steps E422, E522, E523, E524 and E423 can take place, or none, until the life of the session US ends.

At any moment in the life of the session US, the consumption of the credit assigned to the user may need to be tracked, for various reasons. For example, the user him-/herself, or his/her mobile network operator, must know how much credit is remaining in the month, in order to adapt the consumption rate until the end of the month and avoid being overcharged.

This necessity results in a consumption tracking request UCreq from the information system IS of the operator, received by the control entity OPC during a step E531.

During a step E532, the control entity OPC transmits a consumption tracking response UCres containing the value of the meter associated with the remaining total credit for the session US. It is understood that between the moment when this meter was updated for the last time during a step E524 and the moment when the consumption tracking request UCreq is received during step E531, the quota allocated during the last step E523 was not necessarily entirely consumed. The value of the meter is therefore not reliable and depends on the size of the quota which is used between the OPC entities and the PCEF function of the gateway PGW.

FIG. 2 presents an example sequence and implementation of the steps of a method for tracking the consumption of an electronic communication service by a mobile terminal attached to a mobile network, according to an aspect of the invention.

The tracking method according to the invention is implemented by the control entity OPCn, and differs from the prior art in that step E532 described with reference to FIG. 1 is replaced by steps E542 to E548.

Following step E531 when the control entity OPCn receives a consumption tracking request UCreq from the information system IS of the operator, the control entity transmits to the gateway PGW, during a step E542, an update request RARn (Re-Auth-Request), for example of the Diameter type, containing the following parameters:
control session identifier;
IMSI and/or MSISDN of the user;
indication requesting the reporting of the state of the meters, or any other modification of the user session that can thereafter generate a CCRu/CCAu command.

In a known way, the reception of the request RARn by the gateway PGW during a step E432 immediately triggers steps E433 and E434.

During step E433, the gateway PGW transmits to the control entity OPCn an answer RAAn (Re-Auth-Answer), for example of the Diameter type, the function of which is to acknowledge receipt of the request RARn.

During step E434, the gateway PGW transmits to the control entity OPCn an update request CCRn. Unlike the request CCRu transmitted during step E422 described with reference to FIG. 1, this request CCRn contains information relating not to the consumed quota in full, but to the part of the quota consumed at a moment immediately preceding step E434.

The answer RAAn and the request CCRn are received by the control entity OPCn during steps E543 and E544 respectively.

During a step E545 similar to step E523 described with reference to FIG. 1 and triggered by the reception of the credit request CCRn during step E544, the control entity OPCn transmits to the gateway PGW an update answer CCAn containing a new usage quota allocated to the user session, after having verified that the remaining total credit for the user for this session allows it.

During a step E435 similar to step E423 described with reference to FIG. 1, the gateway PGW receives the update answer CCAn, and applies to the user session US, without interrupting it, the control rules updated by the message CCAn, in this case the new usage quota that the user is authorized to consume for the session US.

During a step E546, the control entity OPCn updates the meter associated with the remaining total credit for the session US, adding to it the quota allocated during the last step of transmission of an update answer of type CCAi, CCAu or CCAn, reduced by the part of this quota consumed, which is contained in information received in the request CCRn received during step E544.

During a step D547 similar to step E532 described with reference to FIG. 41, the control entity OPCn transmits a consumption tracking response UCresn containing the value of the meter associated with the remaining total credit for the session US. It is understood that this value corresponds to the consumption state of the credit at a moment immediately preceding step E434. Since the time that has elapsed between this step E434 and step E547 is negligible, the value of the meter is reliable.

During a step E548 similar to step E524 described with reference to FIG. 1, the control entity QPCn updates the meter associated with the remaining total credit for the session US, by subtracting from the allocated quota.

FIG. 3 presents an example sequence and implementation of the steps of a method for tracking the consumption of an electronic communication service by a mobile terminal attached to a mobile network, according to an aspect of the invention, when the terminal is capable of sharing usage credit with other terminals.

In the case of a service offer under a single contract for several members of the same household, or for several employees of the same company, a user might exhaust his/her remaining credit before the others. If no quota can be assigned to the user, the session is terminated due to a lack of credit, and the service is cut off.

FIG. 3 illustrates an aspect of the invention through which remaining credit can be redistributed between all the users in the same group, and thus service cutoffs can be prevented when there is sufficient credit for at least one of the users. The user sessions US1, US2 and US3 in FIG. 3 are associated, for example, by a common contract linking their users or their terminals.

The user sessions US1, US2 and US3 are established in a similar manner to the session US described with reference to FIG. 1. For the sake of generalization, the terminals UT1, UT2 and UT3 are different, and the gateways PGW1, PGW2 and PGW3 are different, but some or all of the terminals can be identical, and some or all of the gateways can be identical.

When the gateway PGW1 detects that the usage quota is reached for the session US1, the gateway PGW1 transmits to the control entity OPCn, during a step E622, an update request CCRu containing information relating to the consumed quota.

During a step E722, the control entity OPCn receives the request CCRu, and deduces from it that a new usage quota must be allocated to the session US.

During a step E730, the control entity OPCn detects that the remaining credit for the user for the session US1 is less than the usage quota that must be allocated. In other words, the session US1 has exhausted all its credit. The control entity OPCn then decides to track consumption for all the other users forming part of the same group as the user of the session US1, in order to check whether there is credit elsewhere. The answer CCAu to the request CCRu is also deferred, unlike in the prior art.

During a step E732 (respectively E752) similar to step E542, the control entity OPCn transmits an update request RARn' (respectively RARn") received by the gateway PGW2 (respectively PGW3) during a step E632 (respectively E642).

During a step E633 (respectively E643) similar to step E433, the gateway PGW2 (respectively PGW3) transmits an answer RAAn' (respectively RAAn"), received by the control entity OPCn during a step E733 (respectively E753).

During a step E634 (respectively E644) similar to step E434, the gateway PGW2 (respectively PGW3) transmits an update request CCRn' (respectively CCRn"), received by the control entity OPCn during a step E734 (respectively E754).

Unlike in the prior art, the control entity OPCn defers the transmission of the answers CCAn' and CCAn" corresponding to the requests CCRn' and CCRn".

During a step E760, on the basis of received information contained in the requests CCRn' and CCRn", the control entity OPCn updates the meters associated with the remaining total credit for the session US2 and the session US3 respectively. If the total of these meters is greater than or equal to a predetermined threshold, a predetermined part of this total is transferred from these meters to the meter associated with the remaining total credit for the session US1. It is only once all the meters are thus updated that the CCA answers, which have been deferred, can resume.

An answer CCAu is transmitted during a step E723 similar to step E523, and is received by the gateway PGW1 during a step E623 similar to step E423.

An answer CCAn' (respectively CCAn") is transmitted during a step E735 (respectively E755) similar to step E523, and is received by the gateway PGW2 (respectively PGW3) during a step E635 (respectively E645) similar to step E423.

The meter update steps E724, E736 and E756 are similar to step E524 described with reference to FIG. 1.

In a variant that is not illustrated, the CCA answers are not deferred except for the answer CCAu of step E723 which is transmitted from the moment when the control entity OPCn knows that there is credit elsewhere, for example as soon as an answer CCRn' of step E734 or CCRn" of step E754 indicates that there is sufficient credit to be redistributed from at least another of the associated sessions US2 or US3.

It is to be noted that if, during step E730, some or all of the sessions US2 or US3 are not in progress, the control entity OPCn can nevertheless consult the usage meters associated with the terminals UT2 and/or UT3 and thus determine whether there is credit to be redistributed.

It is understood also that, by virtue of the invention, it is possible to perform, in only one request/answer between the information system IS and the control entity OPCn, an exact tracking of consumption for a whole group of associated terminals.

With reference to FIG. 4, there is now presented an example structure of a device to track the consumption of an electronic communication service by a mobile terminal attached to a mobile network, according to an aspect of the invention.

The device 100 implements the method for tracking the consumption of an electronic communication service by a mobile terminal attached to a mobile network, for which various embodiments have just been described.

Such a device 100 can be implemented in a control entity, specialized in establishing PCC control rules (QoS and billing characteristics) for IP connectivity sessions (user sessions), for example in PCRF (Policy Control and Charging Rules Function) equipment or in OCS (Online Charging System) equipment.

For example, the device 100 contains a processing unit 130 equipped for example with a microprocessor μP, and driven by a computer program 110 stored in a memory 120 and implementing the method for tracking the consumption of an electronic communication service by a mobile terminal attached to a mobile network, according to the invention. Upon initialization, the code instructions of the computer program 110 are for example loaded into a RAM memory before being executed by the processor of the processing unit 130.

Such a device 100 comprises:
- a transmit module M542, suitable for transmitting a message RAR intended to trigger a credit request for a terminal;
- a receive module M544, suitable for receiving a credit request message CCR relating to a terminal, the message containing information relating to a consumed part of a quota of the remaining credit for the terminal;
- an update module M546, suitable for updating in a usage meter UC the remaining credit for the terminal, Advantageously, the device 100 can comprise:
- a receive module M531, suitable for receiving a credit tracking request UCreq relating to a terminal for a service;
- a transmit module M547, suitable for transmitting a credit tracking response UCres relating to a terminal for a service, containing the value of the remaining credit updated according to the information.

Advantageously, the device 100 can also comprise, in place of or in addition to the modules M531 and M547:
- a verification module M736, suitable for checking whether a remaining credit for a terminal is greater than or equal to a predetermined threshold;
- a sharing module M760, suitable for sharing a remaining credit for at least one terminal with another terminal;
- a transmit module M723, suitable for transmitting a credit answer message CCA for a terminal, the message containing an authorization for the terminal to consume a predetermined quota of credit.

The modules described with reference to FIG. 4 can be hardware or software modules.

The invention claimed is:

1. A method for sharing the consumption of an electronic communication service by a mobile terminal connected to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the method comprising:
- receiving a credit request message from the gateway, relating to the terminal, the message containing information relating to a part of the predetermined quota consumed by the terminal;
- transmitting credit answer message to the gateway, relating to the terminal, containing an authorization for the terminal to consume the predetermined credit quota;
- updating the remaining credit according to the information;
- wherein said transmission of a credit answer message relating to the terminal is deferred until the following acts are carried out, in which the terminal is associated with at least one other terminal having its own nonallocated remaining credit:
  - detecting a remaining credit less than the predetermined quota for the terminal;
  - transmitting, to a gateway associated with the at least one other terminal, a message intended to trigger a credit request relating to the at least one other terminal;
  - receiving a credit request message relating to the at least one other terminal, the message containing information relating to a part of another predetermined quota consumed by the at least one other terminal;
  - updating the remaining credit for the at least one other terminal according to the information, and, if the remaining credit for the at least one other terminal is greater than or equal to a predetermined threshold:
  - sharing the remaining credit for the at least one other terminal, between the terminal and the at least one other terminal.

2. The sharing method of claim 1, wherein the message to the gateway, intended to trigger a credit request relating to the terminal, is a Diameter Re-Authentication Request (RAR) message.

3. The sharing method of claim 1, wherein the credit request message from the gateway, relating to the terminal, is a Diameter Credit Control Request (CCR) message.

4. The sharing method of claim 3, wherein the transmission of a Credit Control Answer (CCA) message in response to the reception of a corresponding Credit Control Request (CCR) message is deferred at least until another CCR message is received.

5. The sharing method of claim 1, wherein the credit answer message to the gateway, relating to the terminal, is a Diameter Credit Control Answer (CCA) message.

6. The sharing method of claim 5, wherein the transmission of a Credit Control Answer (CCA) message in response to the reception of a corresponding Credit Control Request (CCR) message is deferred at least until another CCR message is received.

7. A device comprising a processor, said device being configured to share the consumption of an electronic communication service by a mobile terminal attached to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the terminal being associated with at least one other terminal having its own nonallocated remaining credit, wherein the processor is configured to:
- transmit a message to the gateway, intended to trigger a credit request relating to the terminal;
- receive a credit request message from the gateway, relating to the terminal, the message containing information relating to a part of the predetermined quota consumed by the terminal;
- update the remaining credit for the terminal according to the information;
- verify a remaining credit, intended to verify that a remaining credit for the at least one other terminal is greater than or equal to a predetermined threshold;
- share a remaining credit for the at least one other terminal with the terminal, if the remaining credit for the at least one other terminal has been verified to be greater than or equal to a predetermined threshold; and
- transmit a credit answer message relating to the terminal, the message containing an authorization for the terminal to consume the predetermined quota, if the remaining credit for the at least one other terminal has been shared with the terminal.

8. A computer program, containing instructions for implementing the steps of the method for sharing the consumption of an electronic communication service by a mobile terminal attached to a mobile network, as claimed in claim 1, when this method is executed by a processor non-transitory computer readable medium having stored thereon instructions, which when executed by a processor, cause the computer to perform a method for sharing the consumption of an electronic communication service by a mobile terminal connected to a mobile network, a session for consuming said service being established initially between the terminal and a gateway between the mobile network and a packet-switched network, a remaining credit for consuming said service being assigned initially to the terminal, the terminal periodically requesting authorization to consume a predetermined quota of the remaining credit, the method comprising:
  receiving a credit request message from the gateway, relating to the terminal, the message containing information relating to a part of the predetermined quota consumed by the terminal;
  transmitting credit answer message to the gateway, relating to the terminal, containing an authorization for the terminal to consume the predetermined quota;
  updating the remaining credit according to the information;
  wherein said transmission of a credit answer message relating to the terminal is deferred until the following acts are carried out, in which the terminal is associated with at least one other terminal having its own nonallocated remaining credit:
  detecting a remaining credit less than the predetermined quota;
  transmitting, to a gateway associated with the at least one other terminal, a message intended to trigger a credit request relating to the at least one other terminal;
  receiving a credit request message relating to the at least one other terminal, the message containing information relating to a part of another predetermined quota consumed by the at least one other terminal;
  updating the remaining credit for the at least one other terminal according to the information, and, if the remaining credit for the at least one other terminal is greater than or equal to a predetermined threshold:
  sharing the remaining credit for the at least one other terminal, between the terminal and the at least one other terminal.

* * * * *